United States Patent [19]
McCarthy

[11] Patent Number: 5,329,861
[45] Date of Patent: Jul. 19, 1994

[54] LIGHTWEIGHT PALLET

[76] Inventor: David F. McCarthy, 1319 Swainwood Dr., Glenview, Ill. 60025

[21] Appl. No.: 17,959

[22] Filed: Feb. 12, 1993

Related U.S. Application Data

[63] Continuation of Ser. No. 719,833, Jun. 24, 1991, abandoned.

[51] Int. Cl.$^5$ ............................................. B65D 19/00
[52] U.S. Cl. .................................................. 108/51.3
[58] Field of Search ................. 108/51.3, 56.1, 51.1, 108/56.3

[56] References Cited

U.S. PATENT DOCUMENTS

| | | | |
|---|---|---|---|
| 3,026,078 | 3/1962 | Simkins | 108/51.3 |
| 3,079,876 | 3/1963 | Doane | 108/51.3 |
| 3,167,038 | 1/1965 | Brown | 108/51.3 |
| 3,275,518 | 9/1966 | Shina | 108/51.3 |
| 3,568,912 | 3/1971 | Simas | 108/51.3 X |
| 3,602,158 | 8/1971 | Skaggs | 108/51.3 |
| 3,982,057 | 9/1976 | Briggs et al. | 108/51.3 X |
| 4,145,976 | 3/1979 | Svirklys | 108/56.1 |

OTHER PUBLICATIONS

Jan. 1989 brochure entitled "Paper Honeycomb for Inner Structural Use".
1988 brochure entitled, "Honeycomb Packing System Keeps Round Rolls Round".
1990 brochure entitled, "Reddi-Crate".
1989 brochure entitled, "A Close Look At Honeycomb".

*Primary Examiner*—Jose V. Chen
*Attorney, Agent, or Firm*—McAndrews, Held & Malloy, Ltd.

[57] ABSTRACT

This patent discloses an improved lightweight, recyclable, nearly completely paper pallet. The pallet is made of a Honeycomb paper base and Honeycomb paper support runners or blocks. The blocks are protected and significantly strengthened by a rigid paper cap. The base, runners, blocks, and cap may also have a protective liner, such as polyethylene, or be otherwise treated to enhance water and moisture resistance.

12 Claims, 5 Drawing Sheets

LIGHTWEIGHT PALLET

This application is a continuation of Ser. No. 07/719,833, filed Jun. 24, 1991, entitled "Improved Lightweight Pallet" abandoned.

BACKGROUND

1. Field of Invention

This invention relates to an improved pallet for packaging, material handling, shipping, and the like. More particularly, this invention relates to a pallet that is lightweight and preferably recyclable and durable as well.

2. Prior Art

Traditionally, pallets have been made of wood planks nailed together. In one common structure, a series parallel of upper wood planks are nailed to the top of three transversely extending, parallel, and equally-spaced wood support planks. Similarly, a series of parallel lower wood planks are nailed to the bottom of the three support planks.

Forklift forks can slide under the upper planks in the two parallel channels formed by the three spaced support planks. The forklift can then raise its forks, which lifts the pallet and anything mounted on it.

In an industrial packaging or shipping environment, wood pallets can withstand the often great abuses to which they are subject. The pallet may be dropped or rammed by a forklift or some other machine. The pallet may be slid around on a floor or stored outside in the rain or snow. It may be tossed around vigorously when being stored, stacked, or moved. A wood pallet can withstand a great deal of this type of use and abuse.

Wood pallets are, however, expensive, because they eventually breakdown. When they do, little of the wood is useable to make new pallets. To make new pallets, new wood is often required, which requires cutting down of further trees. This is not only expensive but of great environmental concern.

Wood pallets are also relatively heavy. Their weight increases the cost of storing or shipping products with them.

Wood pallets are also dangerous in that, wear and tear causes the wood to splinter and nails to become exposed. The splinters and exposed nails can damage the product being shipped as well as the human operators working with the pallets.

One attempt at a solution to the problems with wood pallets has been the paper pallet. The paper pallet can be made out of honeycomb paper components. The cellular honeycomb core provides remarkable compression strength, lightweight, and significantly improved cushioning ability over the wood pallet. Further, the paper components are totally recyclable as well as biodegradable. The paper pallet can thus be shredded, baled, and sold as recyclable paper, or alternatively returned to the environment through biodegrading.

One prior art paper pallet is made by International Honeycomb Illinois, Inc., 1149 Central Ave., University Park, Ill. 60466. This Honeycomb paper pallet is made of corrugated Kraft Honeycomb runners or blocks glued to the bottom of a corrugated Honeycomb pallet base or to the bottom of a corrugated cardboard carton. This paper pallet can weigh as little as 95% of the traditional wood pallets of a similar configuration. It also eliminates the need for nails and the problems that exposed nails and wood splinters can cause.

For pallets requiring fork access from only two opposing sides, the paper pallet can use three runners in parallel under the deck or carton. The three parallel runners form two parallel fork channels separated by the center runner. The forks from the forklift then penetrate the two fork channels to lift the pallet or carton.

In other forms of the prior art paper pallets, three parallel rows of three spaced apart paper honeycomb blocks are glued to the underside of a rectangular Honeycomb paper base. In this form, the forks can slide under the base form any of the four sides of the pallet. The three rows each form two channels for the forks on two opposing sides of the pallet, and the three lines of three spaced apart blocks form two transverse fork channels on the other two opposing sides of the pallet.

In yet another prior art paper pallet, called a "GMA" pallet, three parallel rows of three equally spaced Honeycomb paper blocks are glued to the underside of a rectangular paper Honeycomb base. One parallel paper Honeycomb runner is glued to the bottom of each row of blocks. In this manner, the blocks form channels for forks to penetrate and lift in the fork channels they provide intermediate the pallet base, which is glued to the topside of the blocks, and the runners, which are glued to the bottoms of the blocks.

Many of these types of paper pallets are remarkably strong. A standard four inch thick Honeycomb paper pallet made by International Honeycomb Corporation can safely carry a 2,500 pound load.

One problem with these prior art paper products is their significant sensitivity to moisture and humidity. Humidity significantly weakens the paper Honeycomb, and water contact can completely deform the paper Honeycomb and render it completely incapable of supporting any load at all.

One attempt to solve this problem involves coating the paper with polyethylene. The coating is relatively costly, however. It also frequently fails to provide the complete sealing required to keep moisture out of the paper. Particularly as the pallet is used and the forks or other activities erode the liner, leaks can occur, water can penetrate the leaks, and the Honeycomb paper pallet can become greatly weakened and ultimately even rendered useless.

Another problem with these paper pallets is their inherent weakness from damage to exposed sides of the Honeycomb paper runners or blocks. While the Honeycomb paper is remarkably strong in compression, it has very little bending strength. The Honeycomb side walls, which extend vertically, can withstand great compression forces (axially along their length), but relatively little bending force (directed transversely at the side walls of the Honeycomb). As a result, when a support runner or block is rammed in the side by the fork of a forklift as it often is in a shipping and handling environment, the paper Honeycomb is easily crushed and greatly weakened or even destroyed. Consequently, these types of paper pallets often are unacceptably costly not only because of the large numbers of pallets destroyed but also because of resulting damage to product being stored or shipped and the labor cost of fixing and repairing the damage to pallets and product.

OBJECTS AND ADVANTAGES

It is therefore an object of the present invention to develop an improved pallet that is light in weight, durable, and economical.

It is an additional object to provide a pallet that will not yield splinters or exposed nails when used.

Another object is to provide a pallet that is relatively easy to assemble and manufacture, from readily available components, and recyclable as well.

A further object is to provide a paper honeycomb or similar pallet that has blocks or runners with relatively great bending resistance and strength.

A still further object is to provide such a pallet that is relatively resistant to moisture and humidity. Another object is to do so with a stronger bracing material that is easily secured to the Honeycomb sheet or similar material to enhance its bending strength. A still further object is to be able to do so in a variety of configurations with the same basic constituent materials.

There are other objects and advantages. They will become apparent as the specification proceeds.

SUMMARY OF THE INVENTION

The foregoing and other objects and advantages are attained by my invention of a pallet having a pallet base and a plurality of support members secured to the base. The support members and base have significant compression strength and are preferably made of lightweight and recyclable Honeycomb paper. A relatively rigid protective cap abuts certain exposed sides of the support members to provide bending strength to the support members and pallet. The cap may be made of a compressed paper U-shaped beam, which is preferably coated with a moisture resistant layer such as polyethylene. The Honeycomb paper components may be similarly coated as well.

BRIEF DESCRIPTION OF THE DRAWINGS

The preferred embodiment of the present invention is shown in the accompanying drawings in which:

FIG. 5 is a perspective view showing a protective side cap with scored and miter cut ends.

DETAILED DESCRIPTION OF THE PREFERRED EMBODIMENT

Figure 1:
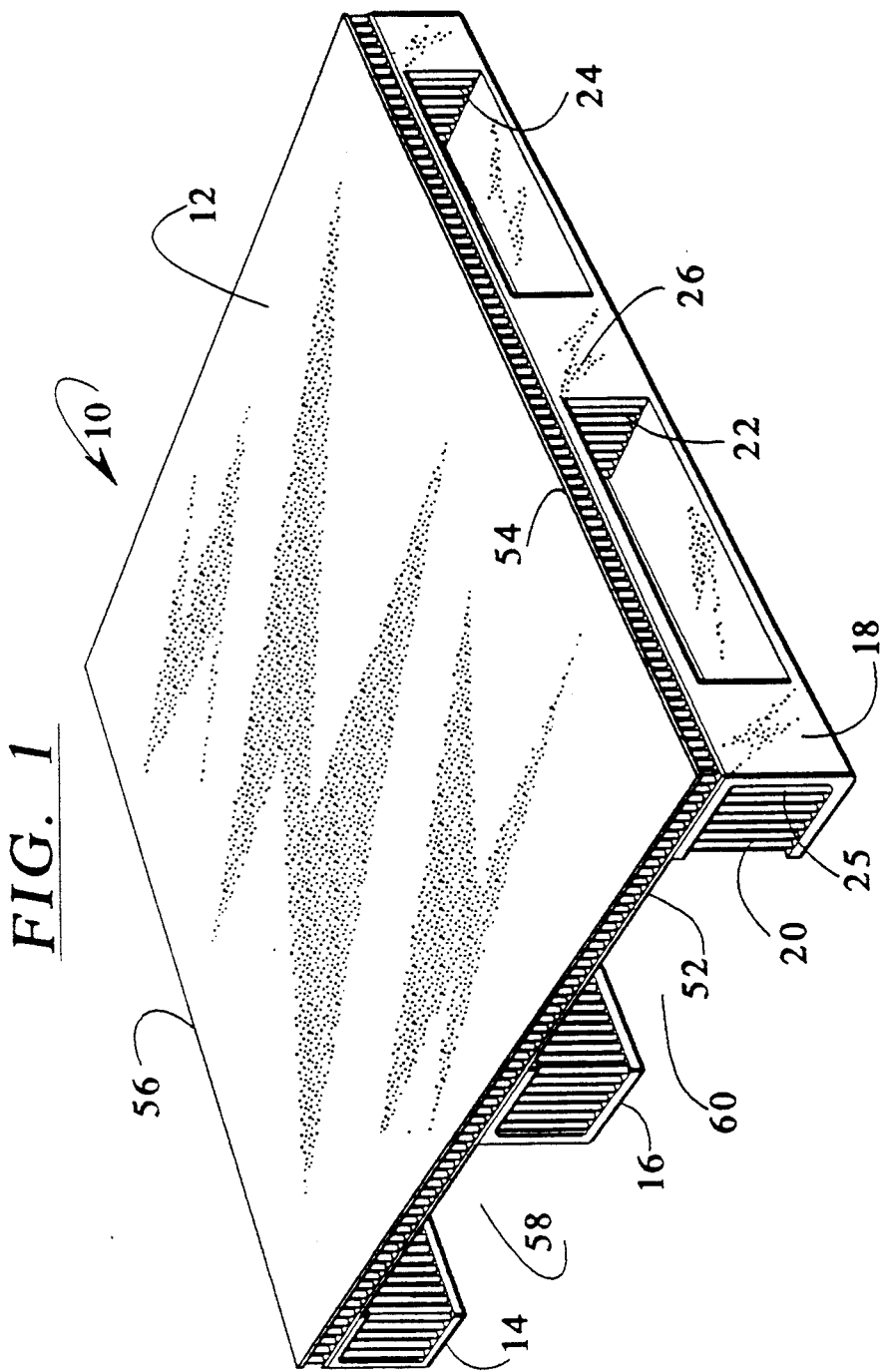
FIG. 1 is a pictorial view of my preferred pallet.

With reference to FIG. 1, the preferred embodiment, generally 10, has a rectangular pallet base 12 mounted on three support runners or beams 14, 16, 18. The pallet base 12 is made of a sheet of Kraft Honeycomb sold by International Honeycomb Illinois, Inc., noted above. The thickness of the base 12 varies depending on the load to be carried by the pallet 10. The support runners, e.g., 18, are each made of four inch thick blocks 20, 22, 24 of the same type of Honeycomb, mounted at equally spaced intervals within the interior channel 25 of a U-shaped, relatively rigid protective cap or beam 26.

The preferred cap 26 bears the trademarks "Reddi Crate" and "U Board," and is made by Conerboard Incorporated, P.O. Box 99, Bridgeport, Pa. The cap 26 is believed to be made of numerous sheets of paper sheeting or cardboard compressed and glued together in a U-shape, which may have a protective, moisture resistant coating, which may be made of polyethylene. This type of cap 16 has relatively great bending strength—much greater than the Honeycomb sheet by itself. When combined with the great compression strength provided by the Honeycomb paper blocks 20, 22, 24, the resulting support runner 18 has relatively great compression and bending strength, particularly in the vicinity of the paper blocks 20, 22, 24.

Figure 2:
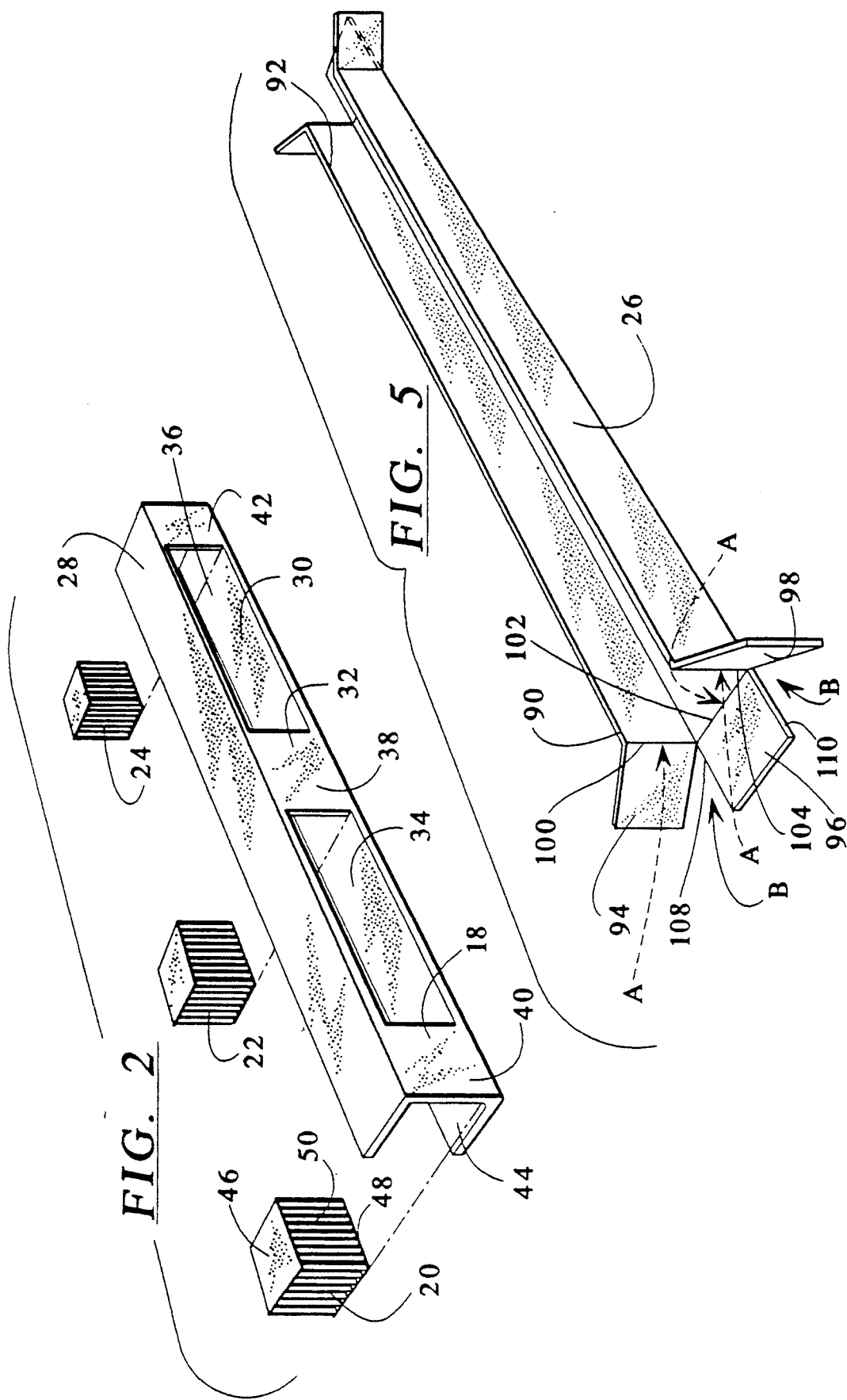
FIG. 2 is an exploded pictorial view of a support runner for the preferred pallet.

Referring now to FIG. 2, the support runner 18 has a planar top surface 28 and a planar bottom surface 30 interconnected by a transverse central planar beam section 32. Two fork channels 34, 36 are cut in the beam section 32. This arrangement yields (1) a central rectangular beam section 38 between the two channels 34, 36 and (2) a left rectangular section 40 and right rectangular beam section 42 at opposing ends of the support beam 18.

The support blocks or cubes 20, 22, 24 are each mounted within the inner periphery 44 of the support beam 18. The first or left block 20, for example, is mounted within the U-shaped cap 26 so that the upper and lower planar support faces or paper sheets 46, 48 of the block 20 respectively abut, and are glued to, the inner periphery 44 of the top surface 28 and the bottom surface 30 of the cap 26. At the same time an otherwise exposed, vertically extending Honeycomb paper side 50 of the block 20 abuts the inner periphery 44 of the left beam section 40.

The remaining center and right support blocks 22, 24 are mounted similarly to respectively abut the central beam section 40 and the right beam section 42. The glue used to secure each block 20, 22, 24 in place is preferably polyvinyl acetate or similar glue.

Figure 3:
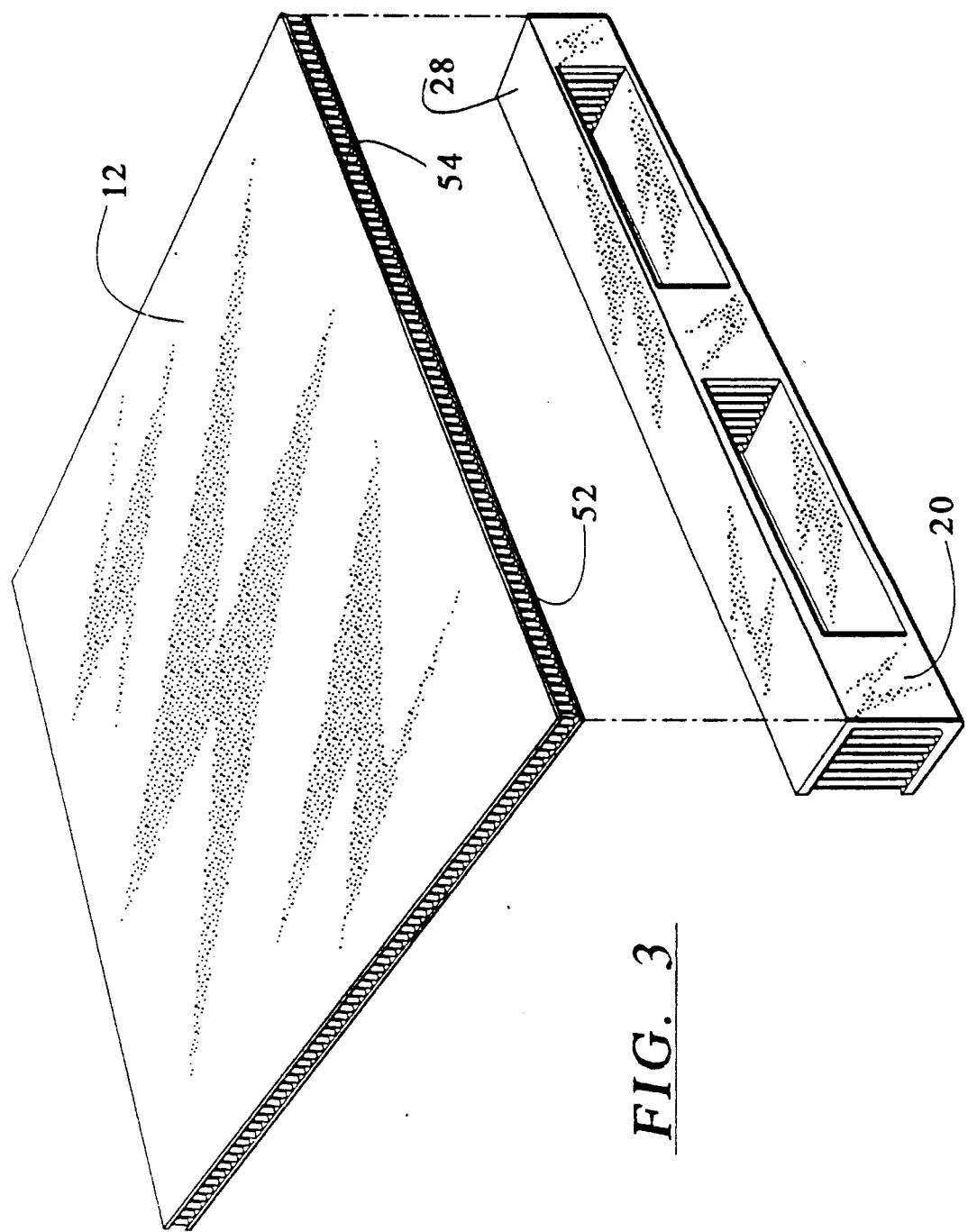
FIG. 3 is an exploded pictorial view showing the mounting of a support runner to a paper honeycomb base in the preferred pallet.

Referring now to FIG. 3, each support runner, e.g., 20, is glued to the bottom face 52 of the pallet base 12. Again, polyvinyl acetate or similar glue is applied to the planar top surface 28 along its entire length, and the top surface 28 is then brought into contact with the desired portion of the bottom face 52 of the base 12.

In this regard, as shown in FIG. 1, the right support runner 20 is mounted on the bottom face 52 adjacent one outer edge or side 54 of the base 12. The left support runner 14 is mounted adjacent the opposing edge 56 of the base 12. Finally, the central support runner 16 is mounted equally spaced from and between the outer support runners 14, 20. In this manner, the equally spaced runners 14, 16, 20 are mounted in parallel to provide a second set of parallel fork channels 58, 60 on the bottom side 52 of the base 12. The first fork channel 58 is bounded by the left runner 14, central runner 16, and bottom side 52; and the second fork channel 60 is bounded by the right runner 18, central runner 16, and bottom side 52 extending between the right and central runners 18, 16.

Figure 4:
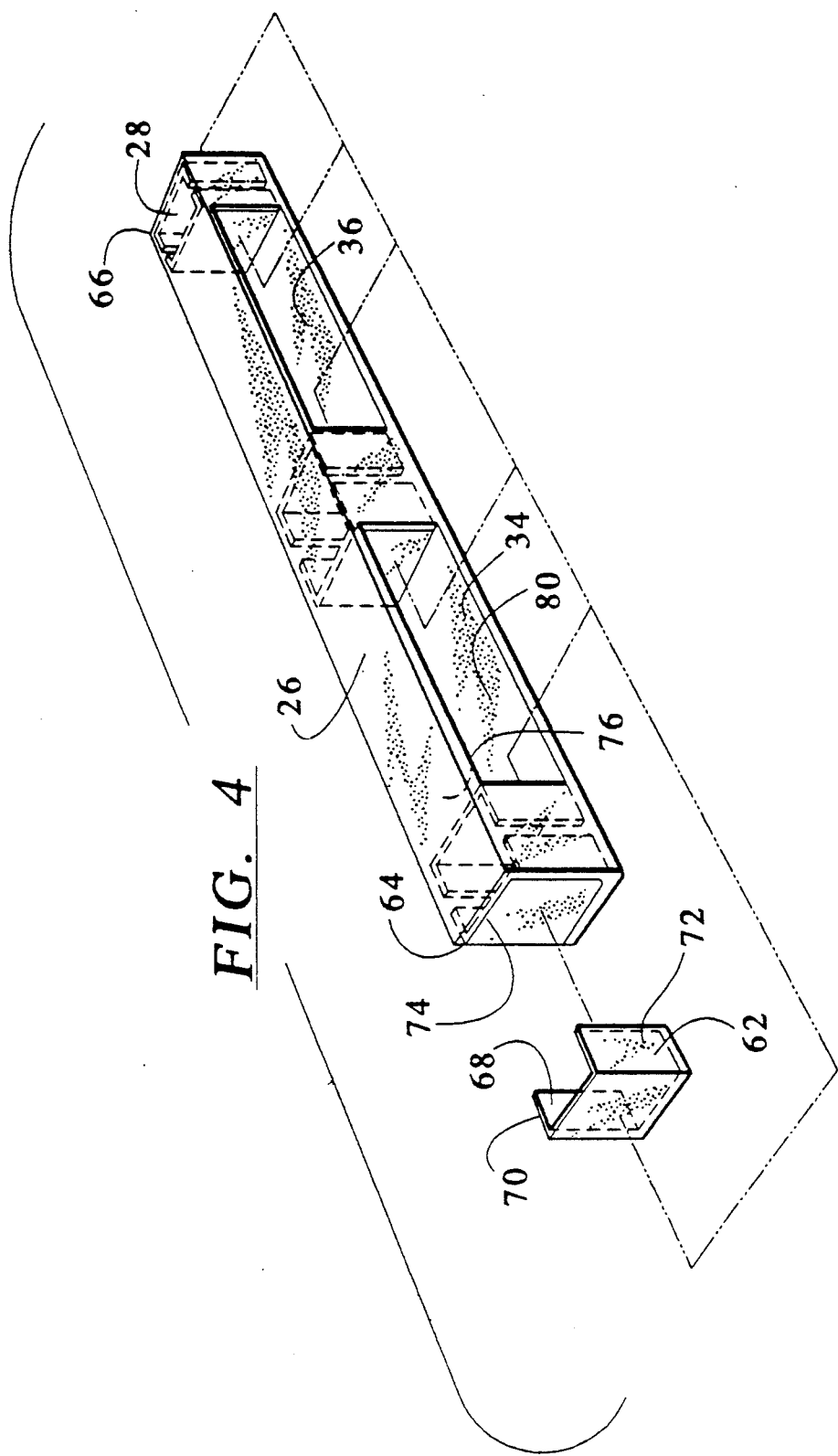
FIG. 4 is a partially exploded pictorial view showing the placement of protective side caps on the support runner of the preferred pallet.

Referring now to FIG. 4, the preferred embodiment includes additional protective end caps, e.g., 62, to provide additional bending strength and protection for the otherwise exposed vertical paper sides of the Honeycomb support blocks (not shown in FIG. 4). The protective end caps 62 are preferably made of the same type of Reddi Crate described above. The end caps 62 may be placed only on the outermost opposing ends 64, 66 of the support beam 28; alternatively, they 62 may also be placed within the first and second fork channels 34, 36 to line the channels 34, 36 in areas where the Honeycomb blocks (not shown in FIG. 4) have exposed sides with relatively little resistance to bending forces or moisture.

Each end cap 62 is retained in place by placing polyvinyl acetate or similar glue on the periphery 68 of each of its outer two arms 70, 72. The right arm 72 can then be slid between the adjacent portions of the inner periphery 44 of the larger protective cap 28 and the side of the first block 20 (not shown in FIG. 4). Simultaneously, the left arm 70 is slid into position adjacent the opposing, otherwise exposed side of the Honeycomb block 20. The end cap 62 is approximately four inches in height, so that (1) its upper edge 74 abuts the lower side 76 of the top support surface 28 of the protective cap 26, and (2) the lower edge 78 of the end cap 62 abuts the upper side 80 of the lower bottom support surface 30 of the protective cap 26.

While the foregoing preferred embodiment has a base 12 that is square, the base 12 could be other shapes, such as circular. Similarly, differently shaped support blocks could be substituted for the runners 14, 16, 18. The blocks would consist of both Honeycomb paper blocks and rigid capping sections abutting them. The capping sections could be made without providing the fork channels 34, 36, which could further strengthen the pallet 10 but would reduce the number of sides of the pallet 10 from which a forklift could approach and lift it 10.

As shown in FIG. 5, an alternative form of the protective cap 26 has each of its opposing ends 90, 92 scored A and miter cut B. Each of the scored and miter cut ends, e.g., 90, thus yields three foldable sections 94, 96, 98. Each of the foldable sections 94, 96, 98 is foldable about its respective transversely extending score line 100, 102, 104 spanning the width of the respective foldable section 94, 96, 98.

Figure 6:
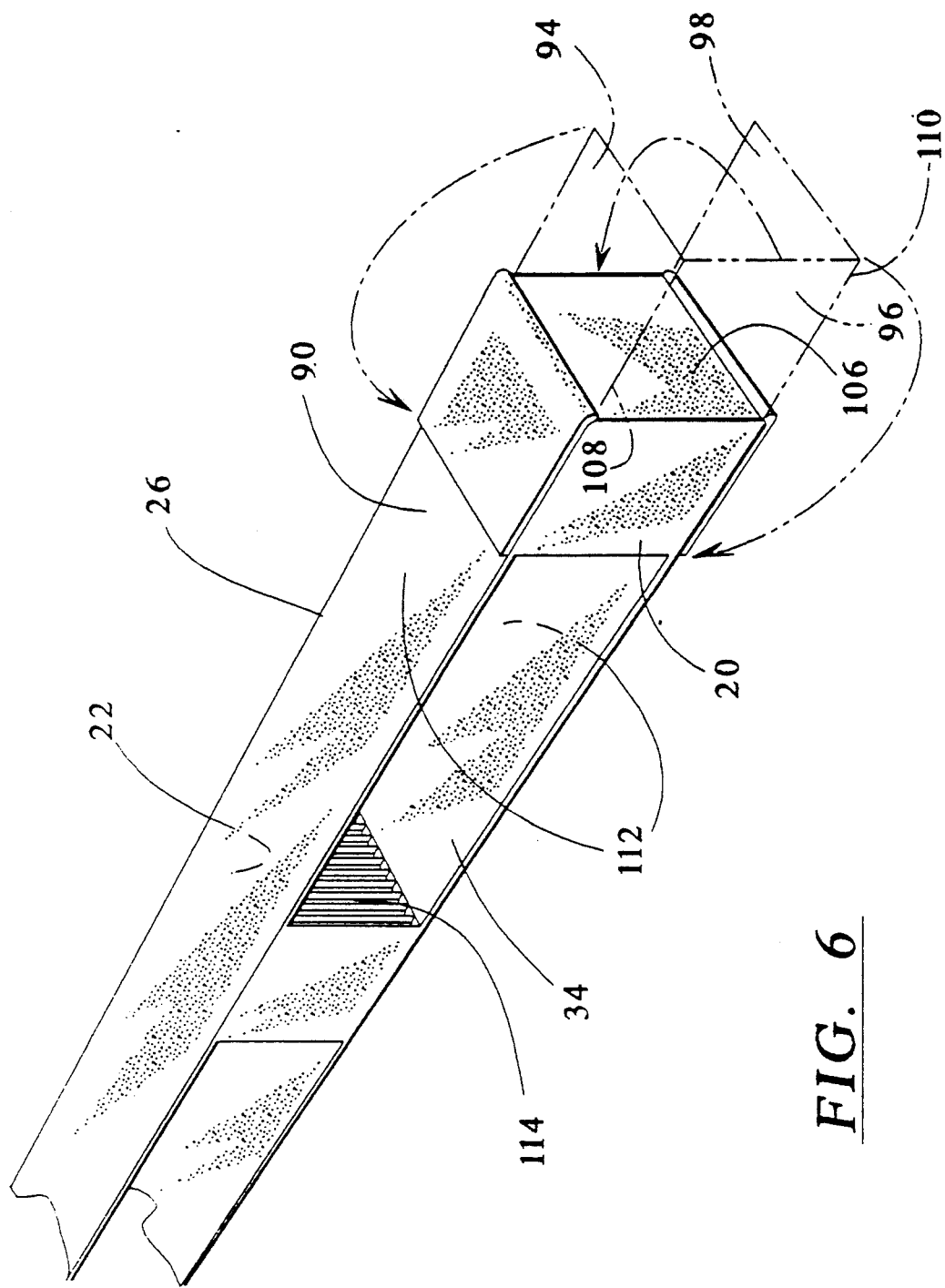
FIG. 6 is a perspective view showing a protective side cap with the scored and mitered ends folded and glued in place to protect the otherwise exposed honeycomb ends of the support runners or blocks.

As shown in FIG. 6, the foldable sections 94, 96, 98 may then be folded about the end 90 of the protective cap 26 and adjacent support block 20 in any number of ways, to form a protective cap layer 106 over the otherwise exposed end (not shown in FIG. 6) of the support block 20. For example, central foldable section 96, with the opposing miter-cut, axially-extending side edges 108, 110, can be folded axially inwardly to abut, and secure with glue to, the otherwise exposed end of the support block 20. The two opposing outer sections 94, 98 can then be rotated axially outwardly to abut, and secure with glue to, the outer periphery 112 of the end 90 of the protective cap 26. Similar scoring and mitering of internal areas of the protective 26 can yield fork channel cutouts, e.g., 34, as well as foldable sections (not shown) that can then fold, and be glued to, otherwise exposed honeycomb sections, e.g., 114, on the support blocks, e.g., 24, in the vicinity of the channels, e.g., 34.

The present improved pallets are both lightweight—much lighter than traditional wood pallets—and recyclable; and they will not splinter or in any other manner yield dangerous, sharp-tipped materials despite vigorous wear and tear. At the same time, they are much stronger and more durable than the conventional prior art paper pallets. They are not only less easily damaged by ramming or other forces, but also much more water and humidity resistant. In this regard, the Reddi Crate cap, which is much more water and moisture resistant than Honeycomb paper, protects the Honeycomb paper by shielding it to a significant degree from contact with snow, rain, or smaller puddles such as are so frequently a problem in packaging and shipping areas.

The moisture resistance of this pallet can be enhanced by using Honeycomb paper sheet that is treated for moisture resistance. The Honeycomb paper base, blocks, and runners can, for example, be coated with polyethylene. The same can be done to the protective cap to further increase its water and humidity resistance.

Finally, the preferred embodiment is made largely of paper. Other lightweight, recyclable materials can be substituted for the preferred paper components while still achieving some of the advantages of the preferred embodiment.

The foregoing is a detailed description of the preferred embodiment. The scope of my invention, however, is determined by reference to the following claims.

What I claim is:

1. An improved pallet of the type used to package, store, or ship goods, the improvement comprising in combination:
   (a) a pallet base having an upper face, a bottom face, and a first side opposite a second side;
   (b) a predominantly U-shaped cap having an interior wall and an exterior wall and being mounted adjacent to the bottom face of the pallet base and extending from the first side to the second side of the pallet base;
   (c) said U-shaped cap having a first arm, a second arm, and a beam section intermediate the first and second arms, the first arm being secured to the bottom side of the pallet base, the beam section being adjacent to the side surface of the support member, and the second arm extending around and below the lowermost portion of the support member; and
   (d) a compression support member having an upper end and a side surface extending transversely downwardly from the upper end, the support member being mounted in the U-shaped cap with the side surface of the support member protectively adjacent an interior wall of the U-shaped cap.

2. The improved pallet base of claim 1 wherein the U-shaped cap has lift fork channels whereby lifting forks can penetrate through the channels to lift the pallet, the support member has a honeycomb structure, the pallet base has a honeycomb structure, the U-shaped cap comprises compressed cellulose sheeting, and the support member and pallet base are comprised of cellulose.

3. The improve pallet of claim 1 wherein the support member has a honeycomb structure and wherein the pallet base has a honeycomb structure.

4. The improved pallet of claim 1 further comprising side caps abutting otherwise exposed end portions of the support member to further provide a protective barrier for the support member.

5. An improved pallet of the type useable to package, store, or ship goods, the improvement comprising in combination:
   (a) a pallet base having a bottom, a top, and a first pallet side opposite a second pallet side;
   (b) a first pallet support secured to the bottom of the pallet base adjacent the first pallet side; and
   (c) a second pallet support secured to the bottom of the pallet base adjacent to the second pallet side and distal from the first pallet side; each such pallet support including:
(i) a compression support member having an upper end and a side surface extending transversely downwardly from the upper end and being nearest the pallet side to which the pallet support is adjacent; and
(ii) a U-shaped cap mounted about the compression member and having an exterior protective wall and an interior wall, the interior wall being adjacent the transverse side of the compression support member of the pallet support, said U-shaped cap having a first arm, a second arm, and a beam section intermediate the first and second arms, the first arm being secured to the bottom side of the pallet base, the beam section being adjacent to the side surface of the support member, and the second arm extending around and below the lowermost portion of the support member.

6. The improved pallet of claim 5 wherein the U-shaped cap has fork channels whereby lifting forks can pass through the channels to lift the pallet, wherein the support member has a honeycomb structure, the U-shaped cap comprises cellulose sheeting, and wherein the support member and the pallet base are comprised of cellulose.

7. The improved pallet of claim 6 wherein the U-shaped cap also includes folded end portions abutting otherwise exposed end portions of the support member to further provide a protective barrier for the support member.

8. The improved pallet of claim 5 wherein the pallet base has a honeycomb structure.

9. An improved lightweight paper pallet of the type that is used to package, store, or ship goods, the improvement comprising in combination:
(a) a rectangular paper honeycomb pallet base having a top face, a bottom face, and a first side opposing a second side;
(b) at least a first and a second compressed paper U-shaped cap, each such cap (i) being mounted adjacent the bottom of the pallet base and extending from the first side to the second side of the pallet base, and (ii) having an interior and exterior wall, a first and a second arm, a beam section interconnecting the first and second arms, and first and second fork channels, the first U-shaped cap being adjacent the first side of the pallet base and distal from the second side of the pallet base, and the second U-shaped cap being adjacent the second side of the pallet base and distal from the first side of the pallet base;
(c) at least a first and a second honeycomb paper support mounted within each U-shaped cap, each such support having an upper end, a bottom end, and a transverse side extending between the upper end and the lower end, the transverse side being adjacent the interior wall of the U-shaped cap, the first support being mounted adjacent one end of the U-shaped cap and the second support being mounted adjacent the other end of the U-shaped cap, each support being mounted separated from a fork channel to avoid contact of a penetrating lift fork with the support member.

10. The improved lightweight pallet of claim 9 further comprising in combination (i) a third compressed paper U-shaped cap mounted between the first and second U-shaped caps, (ii) third and fourth fork channels penetrating the third U-shaped cap, and (iii) third and fourth honeycomb paper support members mounted within the third U-shaped cap, each support member mounted in its respective U-shaped cap adjacent to a fork channel.

11. The improved lightweight pallet of claim 9 also including an additional paper honeycomb support mounted in each U-shaped cap between the two fork channels in the U-shaped cap.

12. The improved pallet of claim 11 wherein the U-shaped cap also includes folded end portions abutting otherwise exposed end portions of the support member to further provide a protective barrier for the support member.

* * * * *